Jan. 23, 1934.  H. GRUBE  1,944,790
JIGGER CONVEYER
Filed April 13, 1933
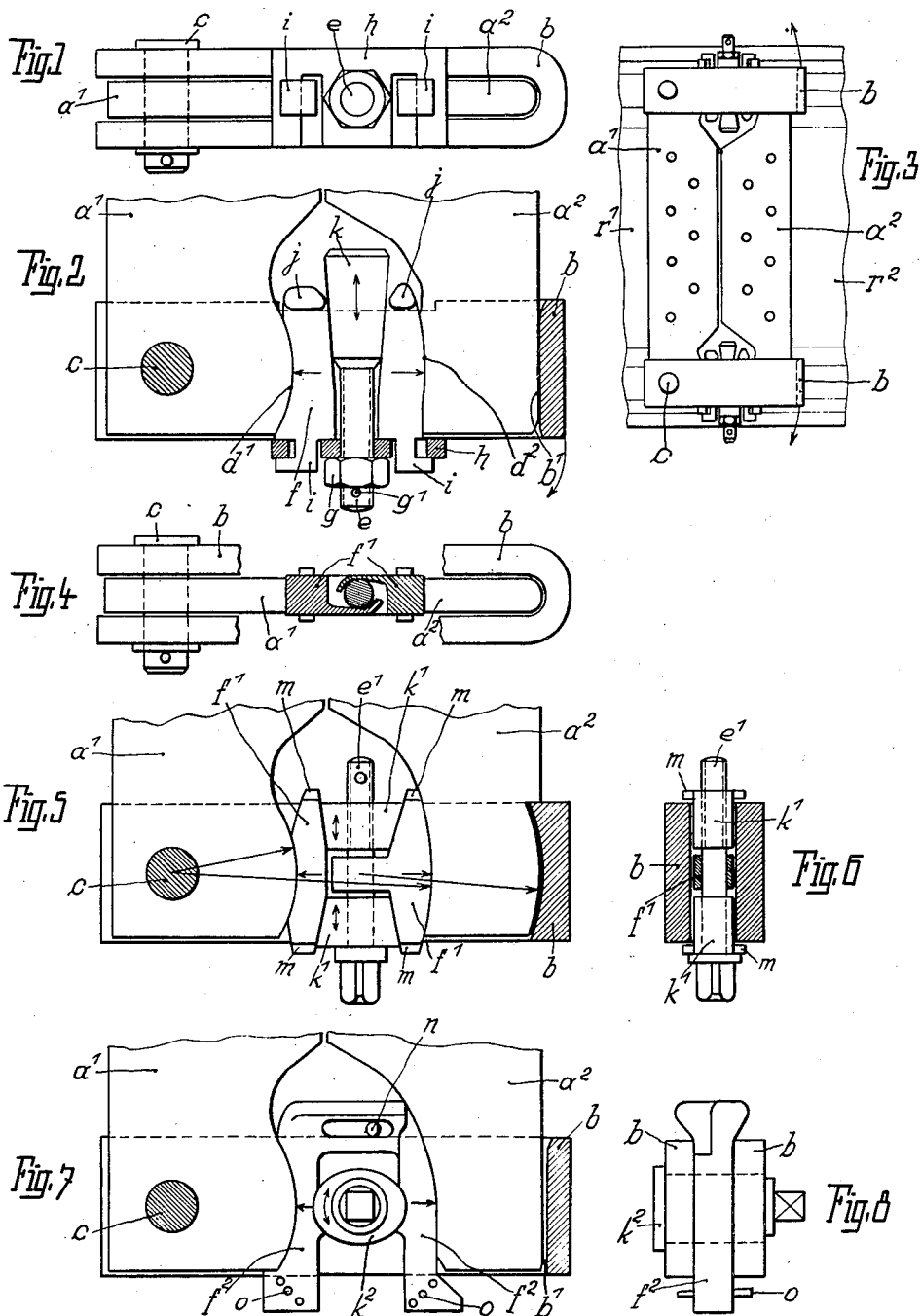
INVENTOR
Heinrich Grube
BY
ATTORNEY Patented Jan. 23, 1934

1,944,790

UNITED STATES PATENT OFFICE 1,944,790

JIGGER CONVEYER

Heinrich Grube, Bochum, Germany, assignor to Gebrueder Eickhoff, Maschinenfabrik und Eisengiesserei, Bochum, Germany Application April 13, 1933, Serial No. 666,041, and in Germany April 23, 1932

4 Claims. (Cl. 198—220)

The present invention relates to a yoke connection for the sections of jigger conveyers in which a yoke is pivotal with respect to transverse beams secured on the plates of the jigger sections and can be clamped by means of a spreader engaging between the transverse beams.

According to the invention packing members are inserted between the spreader and the transverse beams so as to be movable in the longitudinal direction of the yoke. These packing members make it possible for the lateral surfaces of the transverse beams subjected to the pressure of the spreader to be given a shape different from the contour of the spreader. This affords advantages of various kinds. In consequence of the independence of the surfaces of the transverse beams subjected to the pressure of the spreader from the superficial configuration of the spreader, it is possible on the one hand to make the surfaces of the transverse beams of a configuration by means enabling the yoke together with the spreader to be pivoted to embrace the transverse beams without there being only lineal contact between spreader and the transverse beams and moreover by means of these packing members, it is possible to satisfy the requirement that the yoke together with the spreader can be pivotted over the transverse beams and at the same time to fulfill the requirement for the surfaces of contact to be as large as possible. For satisfying this double requirement it is sufficient to make the surfaces of contact of the packing members and of the transverse beams arcuate about the pivot of the yoke as a center. From the point of view of convenient and rapid application and release of the connection and the avoidance of a loss of parts thereof it is however very important that the spreader and the yoke should remain constantly connected. The irreleasable combination of the spreader and the packing members with the pivotal yoke can for example be effected by means of lugs or transverse pins disposed on these parts for example, or by any other simple means.

This insertion of packing members between the spreader or spreaders and the transverse beams makes it possible moreover to shape the surfaces of contact in such way that the connection does not release inadvertently i.e., so that the yoke cannot pivot outwardly when it is not desired that it should do so. In accordance with the present invention this is effected in a very simple way in that at least one of the contact surfaces is given a shape differing from the arc about the pivot, i.e., an arcuate form which has a radius greater than or smaller than the radius of the actual arc having the pivot at its center. In this case the yoke can be pivoted only if the spreader is lifted by an amount corresponding to this deviation of said contact surfaces from the arc of the yoke pivot, whereas when all the surfaces of contact have a concentric arcuate form an automatic pivoting of the yoke can occur even when the spreader is lifted a very small amount which may perhaps occur automatically due to vibrations or extensions of the yoke or in like manner.

Further by means of these packing members the sliding motion occurring between them and the spreader is transformed into a motion directed perpendicularly to the transverse beams so that in consequence no sliding motion occurs at the transverse beams themselves and consequently the wear which is occasioned by the sliding motion of the spreader is confined solely to the spreader and the packing members which, in contradistinction to the cross beams rigidly connected with the jigger sections, can readily be removed when worn and replaced by new elements, In the accompanying drawing:

Figs. 1 and 2 show one embodiment of a yoke connection for jigger conveyer sections in side view and in plan view in horizontal section through the yoke.

Fig. 3 shows this connection in combination with the jigger conveyer sections on a smaller scale, as seen from the underside of the conveyer.

Figs. 4–6 show a second embodiment in side view and in partially sectioned plan view and in cross section.

Figs. 7 and 8 show a third embodiment in cross section and in end view.

By means of a pin $c$ a U-shaped yoke $b$ is pivotally connected in known manner to one of the transverse beams $a^1$ and $a^2$ which are united with the conveyer sections $r^1$ and $r^2$. By means of a spreader or clamping body arranged between the transverse beams, the yoke can be held in that position in which it embraces the ends of the two transverse beams. In accordance with the invention, the body serving for attaining the clamping pressure is constructed with a number of parts in that between the actual spreader and the transverse beams packing members are inserted which are movable in the longitudinal direction of the yoke.

In the embodiment shown in Figs. 1 and 2 the spreader consists of a wedge $k$ longitudinally displaceable with respect to the transverse beams $a^1$ and $a^2$ and between this wedge and the transverse beams, packing members $f$ in the form of flat insertions are provided. On the side adjacent the wedge the packing members are made wedge shaped corresponding to the angle of the wedge, and the adjacent surfaces of the transverse beams $a^1$ and $a^2$ and of the packing members $f$ have the form of arcs $d^1$ and $d^2$, Fig. 2, concentric with respect to the pin $c$. At the front the wedge $k$ is continued in a bolt $e$ and between the nut $g$ and the yoke $b$ is inserted a comb-like bearing plate $h$, the teeth of which pass between hook-like projections $i$ of the packing members $f$. By means of these projections and the plate $h$ on the one hand and the lugs $j$ disposed on the packing members on the inside of the yoke, the entire components of the clamping device are irreleasably united with the yoke $b$ so long as the nut $g$ which is retained by a pin $g^1$ remains on the bolt $e$. If the yoke $b$ is pivoted into the position shown in Fig. 2 and the wedge $k$ is tightened up by means of the nut $g$ then the wedge $k$ slides in the wedging direction with respect to the packing members $f$; the latter however execute merely a motion in the longitudinal direction of the yoke $b$ as indicated by arrow heads in Fig. 2, i. e., in the direction of the pressure which is exerted on the transverse beams $a^1$ and $a^2$, which are thus subjected to no sliding friction when the clamp is applied. After the connection has been clamped in this way, the yoke $b$ is also held against pivotal displacement because in this embodiment the yoke $b$ abuts against the transverse beam $a^2$ with a surface $b^1$ which is straight or at least straight over the greater part of its length; this has the result that the wedge $k$ must be spaced from the coacting surface a comparatively large amount, i. e., must be displaced rearwardly a comparatively large distance, before there is sufficient play of the yoke $b$ to allow it to pivot out of position. Now as however under the effect of the forces arising in the jigger conveyer the connection can loosen only by a very small amount of the natural extension of the yoke $b$, which extension is materially smaller than is necessary for permitting the yoke to pivot, the yoke $b$ after clamping the connection by means of the wedge $k$ is in practice prevented from pivoting out of position.

In the embodiment in Figs. 4–6 wedge members $k^1$ movable in opposite directions by means of headed screw $e^1$ are inserted between the packing members $f^1$; as shown more particularly in Fig. 4, the two packing members $f^1$ embrace the screw $e^1$ in a claw-like manner and by means of lugs $m$ are held against displacement transversely of the yoke. In this embodiment the contact surfaces between the yoke $b$ and the transverse beam $a^2$ is for example arcuate but has a radius smaller than corresponds to the radius of the arc drawn about the pin $c$ as its center. Tightening of the bolt $e^1$ will draw together the wedges $k^1$ which will in turn spread apart the packing members $f^1$. The two beams $a^1$ and $a^2$ will thus be tightly clamped, the beam $a^2$ being forced against the end of the yoke $b$. Loosening of the bolt $e^1$ obviously permits the separation of the wedges and the loosening of the packing members and beams.

In the embodiment according to Figs. 7 and 8 the two jaw-shaped packing members $f^2$ can be forced apart and clamped between the transverse beams $a^1$ and $a^2$ by means of the oval rotary bolt $k^2$. The two jaws $f^2$ are guided on the inner side of the yoke $b$ by means of a hinge pin $n$ and are prevented from sliding off the yoke by means of inserted pins $o$. Turning of the bolt $k^2$ because of its eccentricity obviously spreads the packing members $f^2$ and thereby tightly clamps the beams $a^1$ and $a^2$.

The curvature of the contact surfaces between the packing members and the beams permits the yoke to be swung in the direction of the arrow, Fig. 2, to release the beam. Such swinging is normally prevented, however, by the fact that the surfaces contacting at $b^1$ are not formed about the pivot $c$ as a center. By loosening the packing member wedges, however, swinging of the yoke is permitted.

Naturally the inventive idea originally referred to can be embodied in ways other than the examples shown.

I claim:

1. An arrangement for connecting the sections of a jigger conveyer comprising a yoke which is pivotable over transverse beams secured to the conveyer sections and is adapted to be clamped by means of a spreader engaging between the transverse beams, characterized by packing members movable in the longitudinal direction of the yoke and inserted between the spreader and the transverse beams.

2. An arrangement as claimed in claim 1, wherein the contact surfaces between the packing members and transverse beams are formed as arcs having the pivotal axis of the yoke as their center so that the yoke together with the spreader disposed thereon can be swung into and out of operative position.

3. An arrangement as claimed in claim 1, wherein, of the surfaces of contact between the packing members and the transverse beams and between one transverse beam and the yoke, at least one has a shape differing from an arc having the pivot of the yoke as the center so that the yoke can only be released when the connection has been loosened by a displacement of the spreader corresponding to the deviation of this contact surface from the concentric arcuate surface.

4. An arrangement as claimed in claim 1, in which the packing members are irreleasably secured on the pivotal yoke and the spreader is irreleasably secured to the packing members so that the yoke together with the packing members and the spreader constitutes a coherent whole.

HEINRICH GRUBE.